United States Patent Office 3,307,949
Patented Mar. 7, 1967

3,307,949
DIAZOTYPE INTERMEDIATE COMPRISING A LAYER CONTAINING A TRI-SUBSTITUTED PHENOL COUPLER
Heinz Schlesinger, Wiesbaden, and Johannes Munder, Wiesbaden-Biebrich, Germany, assignors, by mesne assignments, to Keuffel & Esser Company, Hoboken, N.J.
No Drawing. Filed Aug. 12, 1963, Ser. No. 301,623
Claims priority, application Germany, Aug. 15, 1962, K 47,505
26 Claims. (Cl. 96—75)

The present invention relates to diazotype reproduction coatings and more particularly relates to diazotype reproduction coatings for intermediate originals with good covering power.

Diazotype reproduction coatings for the preparation of intermediate originals in which the coupler has an —$SO_3H$ group or a hydrogen and which coupler is characterized by the general formula:

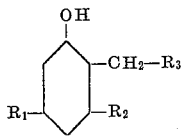

where $R_1$ and $R_2$ stand for similar or different alkyl radicals with straight or branched carbon chains having up to five carbon atoms in a straight chain and where $R_3$ represents a hydrogen atom, an —$SO_3H$ group or a salt or amide of this group.

One object is to provide methods and materials utilizing said coupler for preparing intermediate originals with good covering power.

Other objects will become apparent during the course of the specification.

The 2-hydroxy-4,6-dialkyl-benzene-1-methane sulfonic acids of the present invention which are used as coupling components are prepared by the Mannich condensation process by the reaction of 3,5-dialkyl phenols with equimolar quantities of formaldehyde and secondary amines followed by exchange of the amino group for the sulfonic acid radical by means of sulfite. Another known process likewise starts from the 3,5-dialkyl phenols which are reacted with formaldehyde and sulfite. Examples of suitable 3,5-dialkyl phenols for the reactions are: 3,5-dimethyl-phenol, 3-methyl-5-ethyl-phenol, 3-methyl-5 - isopropyl phenol and 3-ethyl-5-butyl phenol.

The sulfonic acid amides were prepared from the methane sulfonic acids by known methods. It was advantageous for the sulfone to be first prepared by means of p-toluene sulfochloride. This was then reacted in the usual way with amines. Aliphatic and aromatic amines were suitable, e.g., ethylamine, cyclohexylamine, morpholine and aniline. Salts of the 2-hydroxy-4,6-dialkyl-benzene-1-methane sulfonic acid, such as sodium or potassium salt which can be precipitated in accordance with known methods, were particularly satisfactory.

The preparation of the compounds of the present invention is described below with the aid of examples.

244 grams of 3,5-dimethyl-phenol were dissolved in 175 grams of morpholine. 200 ml. of 30% aqueous formaldehyde were added dropwise to this solution, with stirring and cooling, and the mixture was further stirred for some time during which an oil first precipitated and rapidly solidified. It was filtered off, washed with water and recrystallized from methanol. 371 grams (corresponding to 84% of the theoretical yield) of 3,5-dimethyl-2-[morpholino-(4')-methyl]-phenol with a melting point of 96° to 97° C. were obtained.

385 grams of 3,5-dimethyl-2-[morpholino-(4')-methyl]-phenol were dissolved hot in 3500 ml. of ethanol and mixed with a solution of 182 grams of sodium hydrogen sulfite in 1500 ml. of water and heated in the autoclave for 10 hours at 120° C. After cooling, the material was evaporated in vacuo to dryness, washed twice with 350 ml. of methanol and filtered off. The yield was 300 grams of 2-hydroxy-4,6-dimethylbenzene-1-methane sulfonic acid sodium salt. The free sulfonic acid (melting point: 76° C.) was obtained by the introduction of hydrogen chloride into an ethanol suspension of the sodium salt.

2-hydroxy-4,6-dimethyl-1-methane sulfonic acid morpholide was obtained by the suspension of 23.8 grams of 2-hydroxy-4,6-dimethylbenzene-1-methane sulfonic acid sodium salt in a mixture of 100 ml. of dioxane and 13 ml. of pyridine followed by the addition of 19.8 grams of p-toluene sulfochloride and heating under reflux for one hour. After cooling, the mixture was poured into 1500 ml. of water, the precipitated sultone filtered off and recrystallized from a benzene and ligroin mixture. 20 grams of this sultone were heated with 8.7 grams of morpholine in 20 ml. of dry benzene for four hours under reflux. The solution was then concentrated until crystallization took place. The product was filtered off and recrystallized from methanol (fusion point: 162° to 163° C. with decomposition).

The preparation of the compounds in which the radical $R_3$ in the general formula is hydrogen, i.e., the 2-hydroxy-1-methyl-4,6-dialkyl-benzenes, can also be carried out by known methods, e.g., by Mannich condensation of 3,5-dialkyl-phenols with formaldehyde and secondary amines and subsequent catalytic reduction of the reaction product with splitting off of the amine.

Other compounds suitable in the present invention were prepared in a similar manner with slight modifications in the type and quantity of the solvent.

The following are given as examples of the compounds in question:

2-hydroxy-4,6-dimethyl-benzene-1-methane sulfonic acid sodium salt;
2-hydroxy-4,6-dimethyl-benzene-1-methane sulfonic acid;
2-hydroxy-4-ethyl-6-methyl-benzene-1-methane sulfonic acid sodium salt;
2-hydroxy-4-isopropyl-6-methyl-benzene-1-methane sulfonic acid sodium salt;
2-hydroxy-4,6-dimethyl-benzene-1-methane sulfonic acid morpholide;
2-hydroxy-4,6-dimethyl-benzene-1-methane sulfonic acid piperidide;
2-hydroxy-1,6-dimethyl-4-ethyl-benzene;
2-hydroxy-1,4,6-trimethyl-benzene;
2-hydroxy-4-ethyl-6-methyl-benzene-1-methane sulfonic acid morpholide.

The compounds couple with all the usual diazo components. The yellow to greenish yellow dyestuffs formed with certain diazonium compounds, such as para-amino diazonium compounds, absorb light rays of favorable wave-length so that they have outstanding covering power for further copying on light-sensitive coatings. As a result of this increased covering power, the resultant copies are very rich in contrast and are therefore particularly suitable for the preparation of intermediate originals. For example, drawings with weak lines can be reproduced considerably better if the couplers conforming with the invention are used than if intermediate originals prepared with known couplers are used.

It has further been found that the couplers of the present invention are also very suitable as mixers with other couplers for the production of brown and black lines.

The couplers according to the present invention have improved hydrophilic properties so that they coat well on the supporting material, particularly on transparent paper. Exposure times are very short.

The examples herein are given for the purpose of illustration, and it is to be understood that the invention is not limited to these examples.

*Examples*

(1) A solution of 3.1 grams of 2-hydroxy-4-isopropyl-6-methyl-benzene-1-methane sulfonic acid sodium salt, 3.5 grams of citric acid, 3 grams of boric acid, 2 grams of aluminum sulfate and 3 grams of the diazo compound from 1-amino-3-methyl-4-N-ethyl-amino-benzene in the form of the zinc chloride double salt in 100 ml. of water were coated in the usual way upon transparent paper and the coating dried. After being exposed under a master to a 12-amp carbon arc lamp, the material was developed with ammonia vapor. The prints, which had a yellow line, were used very successfully as intermediates for the preparation of further copies.

(2) An acetyl cellulose foil was coated with a solution of the following composition: 40 ml. of methyl glycol, 40 ml. of methyl ethyl ketone, 10 ml. of acetone, 10 ml. of water, 1 gram of thiourea, 1.5 grams of citric acid, 0.5 gram of sulfosalicylic acid, 4 grams of 2-hydroxy-4,6-dimethyl benzene-1-methane sulfonic acid sodium salt and 4 grams of the diazo compound from 1-amino-3-methyl-4-N-ethyl-amino benzene in the form of the fluoborate. After the coating was dried, it was exposed under a master to a 12-amp arc lamp and developed with ammonia vapor in the usual way.

The resultant prints had a brownish yellow line and were very suitable as intermediates.

(3) An opaque paper was coated with a solution of the following composition: 3.5 grams of citric acid, 3 grams of boric acid, 5 grams of thiourea, 1.5 grams of aluminum sulfate, 3 grams of 2-hydroxy-4-ethyl-6-methyl-benzene-1-methane sulfonic acid sodium salt, 1.2 grams of 2-hydroxy-naphthalene-3,6-disulfonic acid (sodium salt), 3 grams of the diazo compound from 1-amino-4-dimethylamino benzene in the form of the zinc chloride double salt in 100 ml. of water. After drying, the coating was exposed in the usual manner to a 12-amp arc lamp and developed with ammonia vapor. The resultant prints had a brown line. When a transparent paper was used as a support under the coating, the prints were usable as intermediates.

Instead of the 2-hydroxy-4-ethyl-6-methyl-benzene-1-methane sulfonic acid sodium salt, 2-hydroxy-4-ethyl-6-methyl-benzene-1-methane sulfonic acid morpholide was used with equally good results.

(4) A solution of 3 grams of 2-hydroxy-4,6-dimethyl-benzene-1-methane sulfonic acid sodium salt, 3 grams of citric acid, 1 gram of aluminum sulfate, 4 grams of thiourea, 2.5 grams of boric acid and 2.8 grams of the diazonium tetrafluoborate of 1-amino-4-morpholino-benzene in a mixture of 50 ml. of isopropyl alcohol and 50 ml. of water was coated upon a transparent paper furnished with a layer of acetyl cellulose lacquer. After drying, the coating was exposed under a master in the usual way and developed with ammonia vapor. An image of the master in yellow with good covering power was obtained.

Instead of the sodium salt of the 2-hydroxy-4,6-dimethyl-benzene-1-methane sulfonic acid, 2-hydroxy-1,4,6-trimethyl benzene was employed with equal success.

It is apparent that the described examples are capable of many variations and modifications within the scope of the present invention. All such variations and modifications are to be included within the scope of the present invention.

What is claimed is:

1. A diazotype intermediate original material comprising a transparent support and a diazotype layer coated on said support, said layer comprising a para-amino diazonium compound and a coupler having the formula:

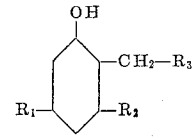

where $R_1$ and $R_2$ are alkyl groups having up to three carbon atoms, and $R_3$ is a member selected from the group consisting of sulfonic acid, alkali metal salts of sulfonic acid, sulfonic acid morpholide, and sulfonic acid piperidide.

2. A material in accordance with claim 1 wherein the coupler is 2-hydroxy-4,6-dimethyl-benzyl-sulfonic acid sodium salt.

3. A material in accordance with claim 1 wherein the coupler is 2-hydroxy-4,6-dimethyl-benzyl-sulfonic acid.

4. A material in accordance with claim 1 wherein the coupler is 2-hydroxy-4-ethyl-6-methyl-benzyl-sulfonic acid sodium salt.

5. A material in accordance with claim 1 wherein the coupler is 2-hydroxy-4-isopropyl-6-methyl-benzyl-sulfonic acid sodium salt.

6. A material in accordance with claim 1 wherein the coupler is 2-hydroxy-4,6-dimethyl-benzyl-sulfonic acid morpholide.

7. A material in accordance with claim 1 wherein the coupler is 2-hydroxy-4,6-dimethyl-benzyl-sulfonic acid piperidide.

8. A material in accordance with claim 1 wherein the coupler is 2-hydroxy-4-ethyl-6-methyl-benzyl-sulfonic acid morpholide.

9. A material in accordance with claim 1 in which said support is transparent paper, said diazonium compound is 3-methyl-4-N-ethyl-amino-benzene diazonium chloride zinc chloride double salt and said coupler is 2-hydroxy-4-isopropyl-6-methyl-benzyl-sulfonic acid sodium salt.

10. A material in accordance with claim 1 in which said support is acetyl cellulose foil, said diazonium compound is 3-methyl-4-N-ethyl-amino-benzene diazonium fluoborate and said coupler is 2-hydroxy-4,6-dimethyl-benzyl-sulfonic acid sodium salt.

11. A material in accordance with claim 1 in which said support is transparent paper, said diazonium compound is 4-diethylamino benzene diazonium chloride and said coupler is 2-hydroxy-4-ethyl-6-methyl-benzyl-sulfonic acid sodium salt.

12. A material in accordance with claim 1 in which said support is transparent paper, said diazonium compound is 4-diethylamino benzene diazonium chloride and said coupler is 2-hydroxy-4-ethyl-6-methyl-benzyl-sulfonic acid morpholide.

13. A material in accordance with claim 1 in which said support is transparent paper coated with a layer of acetyl cellulose, said diazonium compound is 4-morpholino-benzene diazonium tetrafluoborate and said coupler is 2-hydroxy-4,6-dimethyl-benzyl-sulfonic acid sodium salt.

14. A diazotype coating composition comprising a para-amino benzene diazonium compound and coupler of the formula:

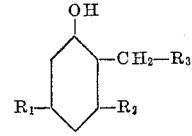

where $R_1$ and $R_2$ are alkyl groups having up to three carbon atoms, and $R_3$ is a member selected from the group consisting of sulfonic acid, alkali metal salts of sulfonic acid, sulfonic acid morpholide, and sulfonic acid piperidide.

15. A coating composition in accordance with claim 14 in which said coupler is 2-hydroxy-4,6-dimethyl-benzyl sulfonic acid sodium salt.

16. A coating composition in accordance with claim 14 in which said coupler is 2-hydroxy-4,6-dimethyl-benzyl-sulfonic acid.

17. A coating composition in accordance with claim 14 in which said coupler is 2-hydroxy-4-ethyl-6-methyl-benzyl-sulfonic acid sodium salt.

18. A coating composition in accordance with claim 14 in which said coupler is 2-hydroxy-4-isopropyl-6-methyl-benzyl-sulfonic acid sodium salt.

19. A coating composition in accordance with claim 14 in which said coupler is 2-hydroxy-4,6-dimethyl-benzyl-sulfonic acid morpholide.

20. A coating composition in accordance with claim 14 in which said coupler is 2-hydroxy-4,6-dimethyl-benzyl-sulfonic acid piperidide.

21. A coating composition in accordance with claim 14 in which said coupler is 2-hydroxy-4-ethyl-6-methyl-benzyl-sulfonic acid sodium salt.

22. A coating composition in accordance with claim 14 in which said diazonium compound is 3-methyl-4-N-ethyl-amino-benzene diazonium chloride zinc chloride double salt and said coupler is 2-hydroxy-4-isopropyl-6-methyl-benzyl-sulfonic acid sodium salt.

23. A coating composition in accordance with claim 14 in which said diazonium compound is 3-methyl-4-N-ethyl-amino-benzene diazonium fluoborate and said coupler is 2-hydroxy-4,6-dimethyl-benzyl-sulfonic acid sodium salt.

24. A coating composition in accordance with claim 14 in which said diazonium compound is 4-diethylamino benzene diazonium chloride and said coupler is 2-hydroxy-4-ethyl-6-methyl-benzyl-sulfonic acid sodium salt.

25. A coating composition in accordance with claim 14 in which said diazonium compound is 4-diethylamino benzene diazonium chloride and said coupler is 2-hydroxy-4-ethyl-6-methyl-benzyl-sulfonic acid morpholide.

26. A coating composition in accordance with claim 14 in which said diazonium compound is 4-morpholino-benzene-diazonium tetrafluoborate and said coupler is 2-hydroxy-4,6-dimethyl-benzyl-sulfonic acid sodium salt.

References Cited by the Examiner

UNITED STATES PATENTS

| | | | |
|---|---|---|---|
| 2,245,628 | 6/1941 | Von Poser et al. | 96—91 XR |
| 2,276,151 | 3/1942 | Brandenberger | 96—75 |
| 2,298,444 | 10/1942 | Weissberger et al. | 96—91 |
| 2,822,272 | 2/1958 | Kosalek et al. | 96—91 |
| 2,946,684 | 7/1960 | Sus et al. | 96—91 |

FOREIGN PATENTS

| | | |
|---|---|---|
| 634,341 | 3/1950 | Great Britain. |
| 796,117 | 2/1958 | Great Britain. |
| 867,200 | 5/1961 | Great Britain. |

J. TRAVIS BROWN, *Primary Examiner.*

A. D. RICCI, C. BOWERS, *Assistant Examiners.*